(12) United States Patent
Brinegar et al.

(10) Patent No.: US 8,459,910 B2
(45) Date of Patent: Jun. 11, 2013

(54) ADJUSTABLE WHEEL STOP SYSTEM FOR LIMITING MOVEMENT OF ATV IN PICKUP BOX

(76) Inventors: Stewart Brinegar, Hebron, NE (US); Robert Dankenbring, Hebron, NE (US)

( * ) Notice: Subject to any disclaimer, the term of this patent is extended or adjusted under 35 U.S.C. 154(b) by 72 days.

(21) Appl. No.: 13/113,687

(22) Filed: May 23, 2011

(65) Prior Publication Data
US 2012/0301243 A1 Nov. 29, 2012

(51) Int. Cl.
*B60P 7/08* (2006.01)

(52) U.S. Cl.
USPC ...................... 410/30; 410/3; 410/8

(58) Field of Classification Search
USPC ............... 410/16, 23–24, 94, 130, 104, 120, 410/3, 8; 414/462, 477, 537
See application file for complete search history.

(56) References Cited

U.S. PATENT DOCUMENTS

| | | | |
|---|---|---|---|
| 3,025,985 A * | 3/1962 | Crawford | 414/537 |
| 4,302,167 A * | 11/1981 | Maffeis et al. | 425/28.1 |
| 4,955,771 A | 9/1990 | Bott | |
| 6,012,885 A | 1/2000 | Taylor et al. | |
| 6,331,094 B1 | 12/2001 | Burrows | |
| 6,536,822 B1 * | 3/2003 | Vagedes et al. | 296/26.1 |
| 6,705,820 B2 | 3/2004 | Schilling | |
| 7,455,491 B1 | 11/2008 | Nielson et al. | |
| 7,549,690 B2 * | 6/2009 | Bourgraf et al. | 296/20 |
| 7,588,401 B2 * | 9/2009 | Latham | 410/7 |
| 2005/0238455 A1 * | 10/2005 | Toteff | 410/104 |
| 2009/0155034 A1 * | 6/2009 | Fonseca, Jr. | 414/480 |

* cited by examiner

*Primary Examiner* — Glenn Dayoan
*Assistant Examiner* — Sunsurraye Westbrook
(74) *Attorney, Agent, or Firm* — Jeffrey L. Thompson; Thompson & Thompson, P.A.

(57) ABSTRACT

An adjustable wheel stop system for limiting movement of an ATV in a pickup box is provided for protecting the cab and rear window of the pickup. The system includes a pair of wheel stop devices for engaging right and left front wheels of the ATV, respectively. Each wheel stop device comprises a base frame adapted to rest on a floor of the cargo area of the pickup, and an upstanding frame having a lower end connected to the base frame and an upper end supported above the base frame for engaging a front side of a front wheel of the ATV. An adjustable bumper protrudes from a front end of the base frame for engaging a front wall of the cargo area. The bumper is adjustable in a longitudinal direction to adjust a spacing between the upstanding frame and the front wall of the cargo area.

14 Claims, 3 Drawing Sheets

ADJUSTABLE WHEEL STOP SYSTEM FOR LIMITING MOVEMENT OF ATV IN PICKUP BOX

BACKGROUND OF THE INVENTION

1. Field of the Invention

The present invention relates generally to devices for restricting movement of cargo and, in particular, to wheel stops for limiting movement of an all-terrain vehicle (ATV) in a pickup box.

2. Summary of the Invention

An object of the present invention is to provide a simple yet highly functional wheel stop system to limit movement of an ATV in a pickup box to prevent damage to a rear window and cab of the pickup.

A further object of the present invention is to provide a wheel stop system that is adjustable in length to adapt to different pickup and ATV configurations.

It is a further object of the present invention to provide wheel stops that are economical to manufacture, efficient and reliable in use, capable of a long operating life, and particularly well suited for use by ATV owners to protect the cab of their pickup.

To accomplish these and other objects, an adjustable wheel stop system is provided for limiting movement of an ATV in the cargo area of a pickup box. The wheel stop system includes a pair of wheel stop devices for engaging right and left front wheels of the ATV, respectively. Each wheel stop device comprises a base frame adapted to rest on a floor of the cargo area; an upstanding frame having a lower end connected to the base frame and an upper end supported above the base frame for engaging a front side of a front wheel of the ATV; and an adjustable bumper protruding from a front end of the base frame for engaging a front wall of the cargo area. The bumper is adjustable in a longitudinal direction to adjust a spacing between the upstanding frame and the front wall of the cargo area. The wheel stop devices function to restrict movement of the ATV within the cargo area of the pickup to prevent damage to the cab of the pickup.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

Figure 1:
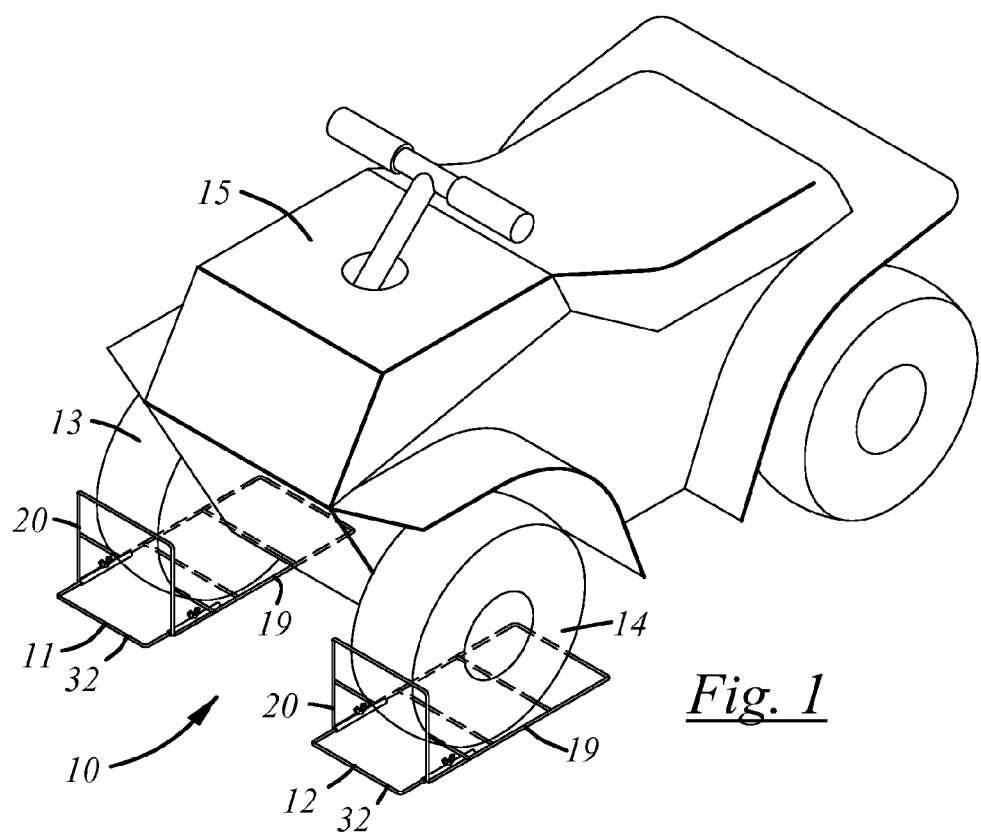
FIG. 1 is a perspective view of the wheel stop system of the present invention shown with an ATV positioned thereon.
Figure 2:
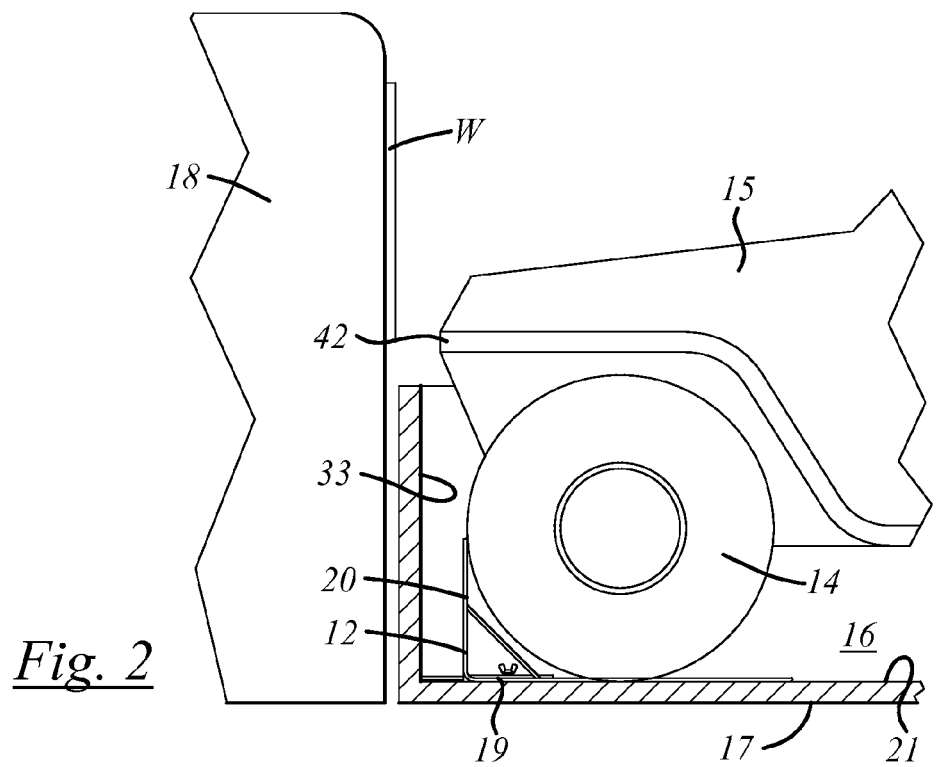
FIG. 2 is a side view of the wheel stop system of the present invention shown positioned in the box of a pickup with the ATV positioned thereon.
Figure 3:
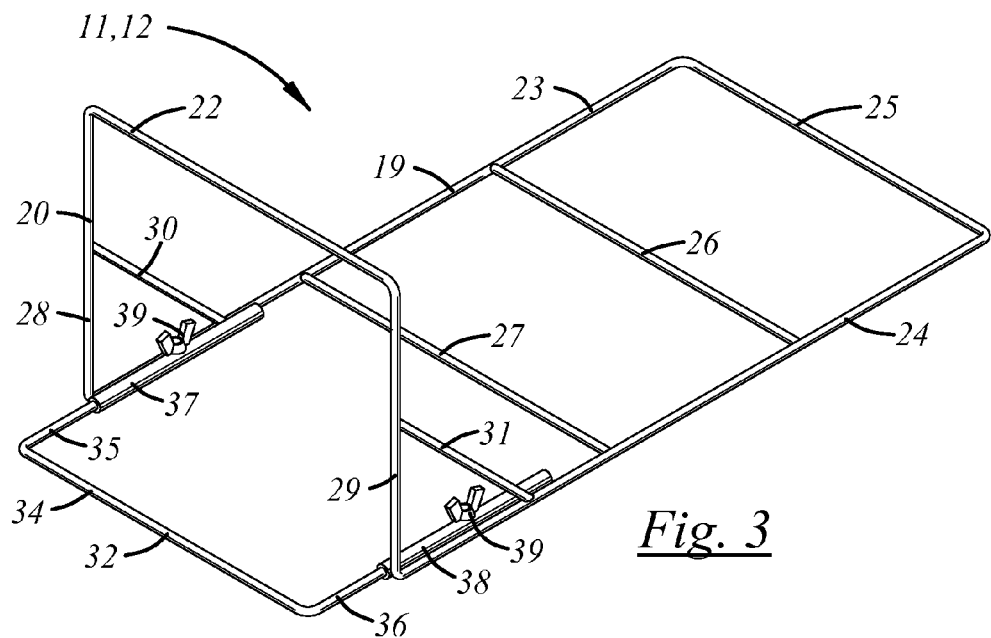
FIG. 3 is a perspective view of one of the wheel stops of the present invention.
Figure 4:
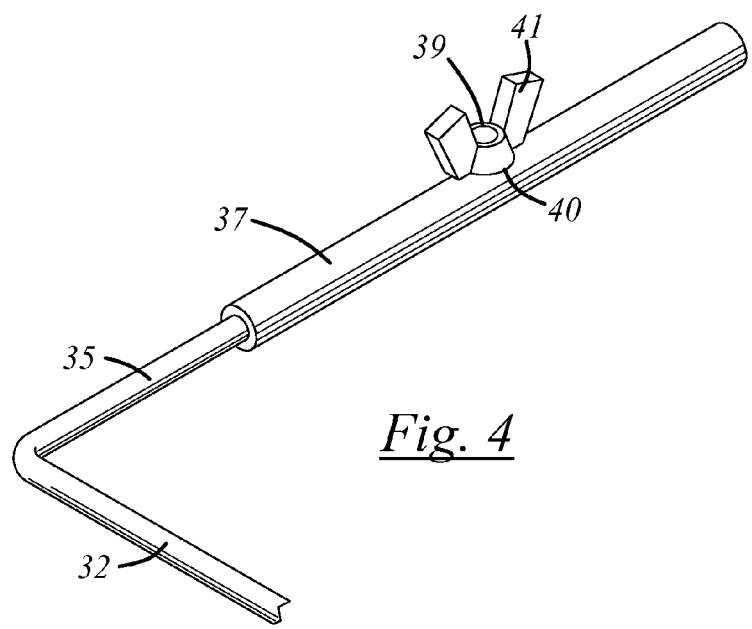
FIG. 4 is an enlarged perspective view of one of the telescoping adjustment mechanisms of a wheel stop of the present invention.
Figure 5:
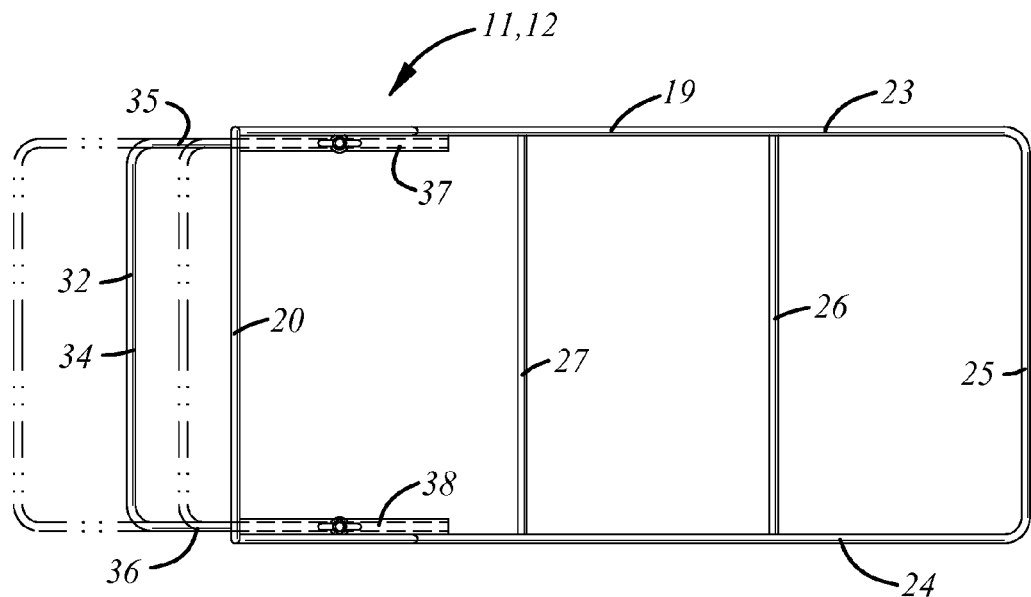
FIG. 5 is a plan view of one of the wheel stops of the present invention with its adjusted positions shown in dashed lines.
Figure 6:
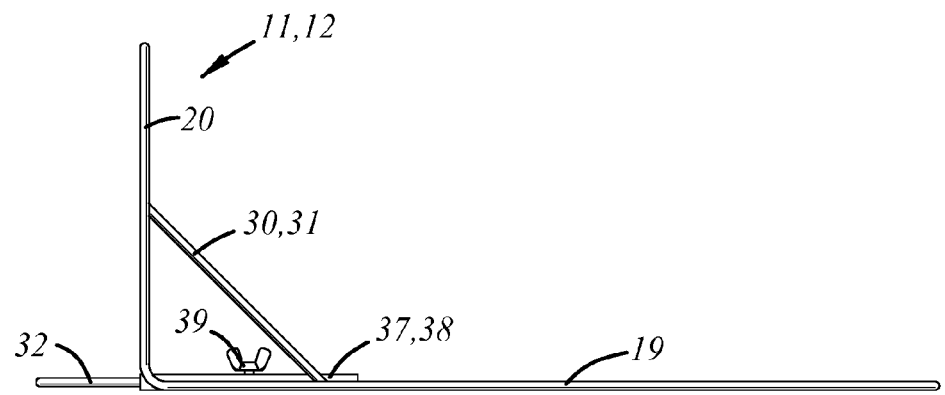
FIG. 6 is a side view of one of the wheel stops of the present invention.

An adjustable wheel stop system 10 according to the present invention will now be described with reference to FIGS. 1 to 6 of the accompanying drawings.

The wheel stop system 10 according to the present invention includes a pair of wheel stop devices 11, 12 for engaging right and left front wheels 13, 14, respectively, of a wheeled vehicle 15. The wheeled vehicle 15 can be, for example, a four-wheel all-terrain vehicle, also referred to as an ATV, which is transported in the cargo area 16 of a pickup box 17. The wheel stop devices 11, 12 engage the front side of each of the right and left front wheels 13, 14 and prevent the ATV 15 from moving forward and smashing into the rear window W or other part of the pickup cab 18.

Each of the wheel stop devices 11, 12 includes a base frame 19 and an upstanding frame 20. The base frame 19 is adapted to rest on a floor 21 of the cargo area 16 of the pickup box 17, while the upstanding frame 20 supports an upper cross frame member 22 for engaging a front side of the ATV wheel 13, 14.

The base frame 19 has a generally rectangular-shaped configuration formed by a pair of longitudinal frame members 23, 24 and a plurality of cross frame members 25-27 connected between the longitudinal frame members 23, 24. The cross frame members include a first rear cross frame member 25, a second intermediate cross frame member 26, and a third intermediate cross frame member 27. The intermediate cross frame members 26, 27 are arranged to be positioned under the respective front wheel 13, 14 of the ATV 15 to keep the wheel stop device 11, 12 in place without tipping.

The upstanding frame 20 includes a pair of vertical frame members 28, 29 which are connected at their lower ends to the front ends of the longitudinal frame members 23, 24 of the base frame 19. The upper cross frame member 22 is connected between the upper ends of the vertical frame members 28, 29 to be supported above the base frame 19. A pair of stabilizing members 30, 31 extend at an angle (e.g., 45 degrees) between the base frame 19 and the upstanding frame 20 to strengthen the connection therebetween.

An adjustable bumper 32 protrudes from a front end of the base frame 19 for engaging a front wall 33 of the cargo area 16. The bumper 32 is adjustable in a longitudinal direction to adjust a spacing between the upstanding frame 20 and the front wall 33 of the cargo area 16. The adjustable bumper 32 is formed by a generally U-shaped structure having a front engaging member 34 extending between a pair of longitudinal side members 35, 36. The longitudinal side members 35, 36 are telescopically received in respective tubular members 37, 38 attached near the front ends of the longitudinal frame members 23, 24 of the base frame 19. The tubular members 37, 38 are attached to the longitudinal frame members 23, 24, for example, by welding.

Male threaded members 39, such as set screws, are used to securely hold the longitudinal side members 35, 36 of the bumper 32 in a selected adjusted position within the tubular members 37, 38. Female threaded receptacles 40 are formed or attached on each of the tubular members 37, 38 to receive the male threaded members 39. The male threaded members 39 are shown having wing heads 41 attached thereto to allow adjustment of the bumper 32 by hand without using tools. Alternatively, the threaded members 39 can have hex heads (not shown) so that a wrench or socket can be used to tighten the threaded members 39 into locking engagement with the side members 35, 36 of the bumper 32. The threaded members 39 and telescoping connection between the side members 35, 36 and the tubular members 37, 38 provide an effective way to secure the bumper 32 in its adjusted position relative to the base frame 19 and the upper cross frame member 22 of the upstanding frame 20.

In the preferred embodiment, the base frame 19, upstanding frame 20, bumper 32, and stabilizing members 30, 31 are all formed of iron rods which are welded together into the configuration shown in the drawings. However, it will be understood that other materials and shapes can be used to make one or more of these components. For example, a single flat plate can be attached between the longitudinal frame members 33, 34 of the base frame 19 instead of the cross members 25-27.

In operation, the wheel stop devices 11, 12 are placed on the floor 21 of the cargo area 16 of a pickup box 17 with the base frames 19 resting on the floor 21 and the upstanding frames 20 extending upwardly from the base frames 19. The wheel stop devices 11, 12 are located near the front of the cargo area 16 with the bumper 32 engaging the front wall 33 of the cargo area 16. The ATV 15 is then loaded into the cargo area 16 and rolled over the cross frame members 25-27 of the base frame 19 until the front sides of the right and left front wheels 13, 14 engage the upper cross frame member 22 of the upstanding frame 20. If the front end 42 of the ATV 15 protrudes past the wheel stop devices 11, 12 and into engagement with either the front wall 33 of the cargo area 16 or the cab 18 of the pickup, then the bumpers 32 of the wheel stop devices 11, 12 are adjusted to space the upper cross frame members 22 further from the front wall 33 of the cargo area 16. The adjustment is done by loosening the threaded members 39 to allow the longitudinal side members 35, 36 of the bumpers 32 to be telescopically adjusted within the tubular members 37, 38 to the desired position. The threaded members 39 are then tightened to lock the bumper 32 in the desired position. The wheel stop devices 11, 12 can thus be adjusted to accommodate a variety of ATV and pickup box configurations.

While the invention has been specifically described in connection with specific embodiments thereof, it is to be understood that this is by way of illustration and not of limitation, and the scope of the appended claims should be construed as broadly as the prior art will permit.

What is claimed is:

1. An adjustable wheel stop device for limiting movement of a wheeled vehicle in a cargo area, comprising:
   a base frame adapted to rest on a floor of the cargo area;
   an upstanding frame having a lower end connected to the base frame and an upper end supported above the base frame;
   an adjustable bumper having a front engaging member protruding from a front end of the base frame for engaging a front wall of the cargo area, said bumper being adjustable in a longitudinal direction to adjust a spacing between the upstanding frame and the front wall of the cargo area; and
   said base frame comprises a pair of longitudinal frame members connected by at least one cross frame member arranged to be positioned under and engaged by a bottom side of a wheel of the wheeled vehicle when a front side of the wheel is engaged with the upstanding frame, and said upstanding frame is located between said at least one cross frame member of said base frame and said front engaging member of the adjustable bumper.

2. The adjustable wheel stop device according to claim 1, wherein the longitudinal frame members are connected by a plurality of cross frame members to form a generally rectangular-shaped configuration.

3. The adjustable wheel stop device according to claim 1, wherein the upstanding frame comprises an upper cross frame member supported above the base frame by a pair of vertical frame members which are connected at their lower ends to the base frame.

4. The adjustable wheel stop device according to claim 1, further comprising a pair of stabilizing members extending at an angle between the base frame and the upstanding frame to stabilize the upstanding frame relative to the base frame.

5. The adjustable wheel stop device according to claim 1, wherein the adjustable bumper comprises a generally U-shaped structure having longitudinal side members that are telescopically received in tubular members attached to the base frame.

6. The adjustable wheel stop device according to claim 5, further comprising a threaded members that can be tightened into locking engagement with the longitudinal side members of the bumper to secure the bumper in its adjusted position relative to the base frame.

7. A wheel stop system for limiting movement of a wheeled vehicle in a cargo area of a pickup, comprising:
   a pair of wheel stop devices for engaging right and left wheels of the wheeled vehicle, respectively, each wheel stop device comprising:
      a base frame adapted to rest on a floor of the cargo area;
      an upstanding frame having a lower end connected to the base frame and an upper end supported above the base frame for engaging a front side of a respective front wheel of the wheeled vehicle; and
      an adjustable bumper having a front engaging member protruding from a front end of the base frame for engaging a front wall of the cargo area, said bumper being adjustable in a longitudinal direction to adjust a spacing between the upstanding frame and the front wall of the cargo area;
   whereby forward movement of the wheeled vehicle within the cargo area of the pickup is restricted by the wheel stop devices to prevent damage to the cab of the pickup; and
   wherein the base frame of each wheel stop device comprises a pair of longitudinal frame members connected by at least one cross frame member which is arranged to be positioned under and engaged by a bottom side of the respective front wheels of the wheeled vehicle when the front side of the respective front wheel is engaged with the upstanding frame, and said upstanding frame of each wheel stop device is located between said at least one cross frame member of said base frame and said front engaging member of the adjustable bumper.

8. The wheel stop system according to claim 7, wherein the upstanding frame of each wheel stop device comprises an upper cross frame member supported above the base frame by a pair of vertical frame members which are connected at their lower ends to the base frame.

9. The wheel stop system according to claim 7, wherein each of the wheel stop devices further comprises a pair of stabilizing members extending at an angle between the base frame and the upstanding frame to stabilize the upstanding frames relative to the base frames.

10. The wheel stop system according to claim 7, wherein the adjustable bumper of each wheel stop device comprises a pair of longitudinal adjustment members that are telescopically received in respective tubular members attached to the base frame, and said front engaging member extends between the longitudinal adjustment members.

11. The wheel stop system according to claim 10, wherein each wheel stop device further comprises threaded members that can be tightened into locking engagement with the longitudinal adjustment members of the bumper to secure the bumper in its adjusted position relative to the base frame.

12. An adjustable wheel stop device for limiting movement of a wheeled vehicle in a cargo area of a pickup, comprising:
   a base frame adapted to rest on a floor of the cargo area, said base frame having a generally rectangular configuration defined by a pair of longitudinal frame members connected together by a plurality of cross frame members;
   an upstanding frame having a lower end connected to the base frame near a front end thereof and an upper end supported above the base frame for engaging a front side of a front wheel of the wheeled vehicle; and
   an adjustable bumper having a front engaging member protruding forwardly from the front end of the base frame for engaging a front wall of the cargo area, said bumper being adjustable in a longitudinal direction to adjust a spacing between the upper end of the upstanding frame and the front wall of the cargo area;
   wherein at least one of the cross frame members of the base frame is arranged to be positioned under and engaged by a bottom side of the wheel of the wheeled vehicle when the front side of the wheel is engaged with the upstanding frame, and said upstanding frame of each wheel stop device is located between said at least one cross frame member of said base frame and said front engaging member of the adjustable bumper.

13. The adjustable wheel stop device according to claim 12, wherein the adjustable bumper comprises a pair of longitudinal adjustment members that are telescopically received in respective tubular members attached to the base frame, and said front engaging member extends between the longitudinal adjustment members.

14. The adjustable wheel stop device according to claim 13, further comprising a pair of threaded members that can be tightened into locking engagement with the longitudinal adjustment members of the adjustable bumper to secure the bumper in its adjusted position relative to the base frame.

* * * * *